United States Patent
Uchino (10) Patent No.: US 11,274,759 B2
(45) Date of Patent: Mar. 15, 2022

(54) ONE-WAY VALVE AND TRANSMISSION

(71) Applicant: HONDA MOTOR CO., LTD., Tokyo (JP)

(72) Inventor: Satoshi Uchino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/804,972

(22) Filed: Feb. 28, 2020

(65) Prior Publication Data

US 2020/0278041 A1    Sep. 3, 2020

(30) Foreign Application Priority Data

Mar. 1, 2019   (JP) .............................. JP2019-037785

(51) Int. Cl.
  *F16K 17/04*   (2006.01)
  *F16H 61/02*   (2006.01)

(52) U.S. Cl.
  CPC .......... *F16K 17/04* (2013.01); *F16H 61/0262* (2013.01); *F16H 61/0276* (2013.01); *F16H 2061/0279* (2013.01); *F16H 2708/20* (2013.01)

(58) Field of Classification Search
  CPC ...... F16K 17/04; F16K 15/063; F16K 15/025; F16K 15/02
  See application file for complete search history.

(56) References Cited

U.S. PATENT DOCUMENTS

| | | | | |
|---|---|---|---|---|
| 1,086,549 A * | 2/1914 | Miller | ................... | F16K 15/063 137/543 |
| 1,228,565 A * | 6/1917 | Kean | ..................... | F16K 15/025 137/506 |
| 2,804,086 A * | 8/1957 | Johnston | ............... | F16K 15/025 137/329.02 |
| 3,029,835 A * | 4/1962 | Biello | ................... | F16K 15/063 137/515.5 |
| 9,970,571 B2 | 5/2018 | Kuromusha | | |
| 2017/0321595 A1* | 11/2017 | Jang | ......................... | F16K 5/12 |

FOREIGN PATENT DOCUMENTS

| | | |
|---|---|---|
| CN | 106151605 A | 11/2016 |
| CN | 206159449 U | 5/2017 |
| CN | 109084016 A | 12/2018 |

(Continued)

OTHER PUBLICATIONS

Office Action including search report dated Mar. 30, 2021 issued over the corresponding Chinese Patent Application No. 202010130588.8 with the partial English translation of the Office Action.

(Continued)

*Primary Examiner* — Reinaldo Sanchez-Medina
*Assistant Examiner* — Nicole Gardner
(74) *Attorney, Agent, or Firm* — Carrier Blackman & Associates, P.C.; William D. Blackman; Joseph P. Carrier (57) ABSTRACT

A one-way valve includes: a cylindrical section, one end of which is inserted into and fixed to an inside of a pipe, the cylindrical section including a through-hole through which oil is passed in an axial direction; and a columnar section housed inside the pipe and including, in another end thereof, a plurality of lateral holes through which oil is passed, flow of oil being blocked when the other end is inserted into a one-side opening section of the cylindrical section.

11 Claims, 5 Drawing Sheets

(56) References Cited

FOREIGN PATENT DOCUMENTS

| JP | S54-102729 U | 7/1979 |
| JP | H02-122280 U | 10/1990 |
| JP | H10-096478 A | 4/1998 |
| JP | 2015-209906 A | 11/2015 |
| WO | 2014/203369 A1 | 12/2014 |

OTHER PUBLICATIONS

Office Action dated Dec. 21, 2021 issued over the corresponding Japanese Patent Application No. 2019-037785 with the English translation of the Office Action.

* cited by examiner

ONE-WAY VALVE AND TRANSMISSION

CROSS-REFERENCE TO RELATED APPLICATION

This application is based upon and claims the benefit of priority from Japanese Patent Application No. 2019-037785 filed on Mar. 1, 2019, the contents of which are incorporated herein by reference.

BACKGROUND OF THE INVENTION

Field of the Invention

The present invention relates to a one-way valve used in a hydraulic control assembly controlling hydraulic pressure supplied to a transmission of a vehicle or the like, and to a transmission in which the one-way valve is installed.

Description of the Related Art

Japanese Laid-Open Patent Publication No. 2015-209906 addresses a problem of providing a thermostat device that is able to achieve overall downsizing and compacting, and also cost reduction.

In order to solve this problem, the above-mentioned thermostat device comprises a thermostat valve and a relief valve. The thermostat valve is provided along the way of a fluid passage, and opens/closes according to a fluid temperature. The relief valve is integrally arranged so as to supplement the thermostat valve, on an upstream side of the thermostat valve, and opens/closes the fluid passage according to a fluid pressure. Moreover, the above-described thermostat device is configured so that a flow path in the passage communicates only in the case where the fluid temperature of the fluid passage is a predetermined temperature or more (a high temperature state) and the fluid pressure of the fluid passage has attained a predetermined pressure or more. Moreover, in the above-described thermostat device, in the case where the fluid temperature of the fluid passage is a predetermined temperature or less (a low temperature state), the thermostat valve keeps a closed state, and, even when the fluid pressure has changed so that the relief valve attains an opened state, the flow path in the passage maintains a non-communicating state.

SUMMARY OF THE INVENTION

Incidentally, there is a problem that when the vehicle is left for a long period, oil in a torque converter falls into an oil pan, and at a restart time, creep torque does not occur until refilling of oil is completed.

As a countermeasure against this, it is conceivable for a discharge oil path to be sealed by a one-way valve during oil pump stoppage so as to prevent oil escaping. In this case, for installation of the one-way valve, there may be considered exclusively designing the hydraulic control assembly and reducing an oil path area of a portion where oil path layout is difficult, thereby securing an installation area for the one-way valve.

However, such a method causes a new problem that the layout of the oil path in the hydraulic control assembly becomes complicated.

The present invention was made in order to solve the above-mentioned problems, and has an object of providing a one-way valve that can be simply installed, without the layout of an oil path in a hydraulic control assembly being made complicated.

In addition, the present invention has an object of providing a transmission in which the one-way valve is installed.

A first aspect of the present invention includes: a cylindrical section, one end of which is inserted into and fixed to an inside of a pipe, the cylindrical section including a through-hole through which oil is passed in an axial direction; and a columnar section housed inside the pipe and including, in another end thereof, a plurality of lateral holes through which oil is passed, flow of oil being blocked when the other end is inserted into a one-side opening section of the cylindrical section.

A second aspect of the present invention is a transmission that includes: a hydraulic control assembly in which a plurality of hydraulic control valves are incorporated; and a case in which the hydraulic control assembly is housed, wherein the one-way valve of the first aspect is disposed in the case.

The first aspect of the present invention makes it possible to provide a one-way valve that can be simply installed, without the layout of an oil path in the hydraulic control assembly being made complicated.

The second aspect of the present invention makes it possible to provide a transmission in whose case the one-way valve is installed.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Embodiment examples of a one-way valve and a transmission according to the present invention will be described below with reference to FIGS. 1A-5.

Figure 1A:
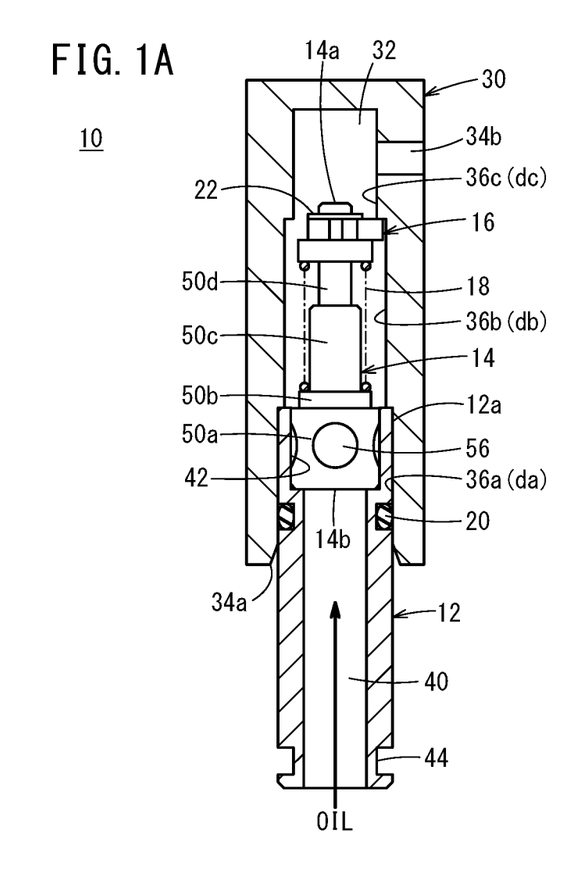
FIGS. 1A and 1B are each a cross-sectional view showing a configuration of a one-way valve according to the present embodiment, with FIG. 1A specifically showing a state where flow of oil has been blocked, and FIG. 1B specifically showing a state where oil has been flowed in one direction.
Figure 1B:
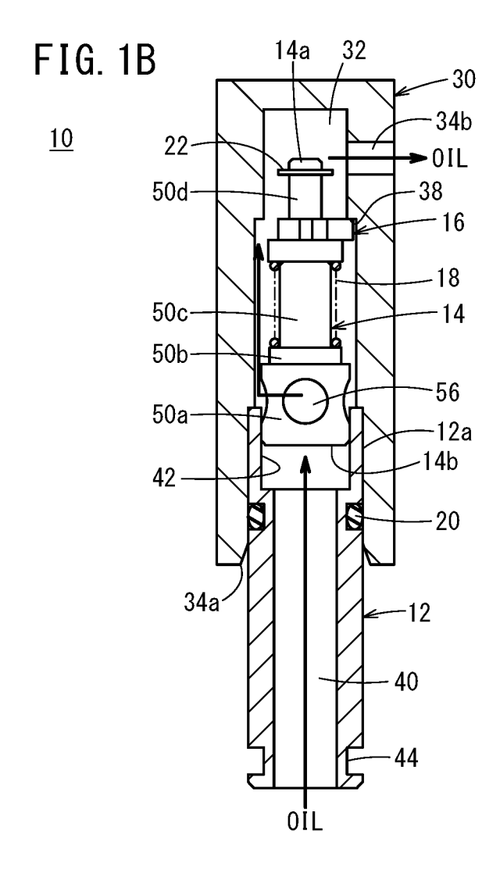

First, a one-way valve 10 according to the present embodiment is configured as a metal component, for example. As shown in FIGS. 1A and 1B, the one-way valve 10 includes at least a cylindrical section 12, a columnar section 14, a collar member 16, a spring 18, an O-ring 20, and a retainer clip, which may be an E-ring 22. The one-way valve 10 is configured so that a part thereof is inserted into a hollow section 32 of an arbitrary pipe 30. The cylindrical section may also be referred to as a cylindrical tube section, and the columnar section may be referred to as the columnar flow control section.

The pipe 30 is formed in a cylindrical shape with one end closed, and includes: a first opening 34a into which the cylindrical section 12 is inserted; and a second opening 34b formed in a circumferential wall. Of course, the second opening 34b may be formed in a blocked upper section to penetrate in an axial direction.

Moreover, an inner diameter of the hollow section 32 in the pipe 30 narrows in three stages in a depth direction. In other words, the hollow section 32 has a first inner circumferential surface 36a, a second inner circumferential surface 36b, and a third inner circumferential surface 36c in the depth direction from the first opening 34a. A magnitude relationship of inner diameters da, db, and dc of the first inner circumferential surface 36a, the second inner circumferential surface 36b, and the third inner circumferential surface 36c satisfies da>db>dc.

On the other hand, the cylindrical section 12 of the one-way valve 10 has one end 12a inserted into and fixed in the hollow section 32 of the arbitrary pipe 30, and includes a through-hole 40 through which oil (not illustrated) is passed in an axial direction. Note that the pipe 30 is configured in such a manner that oil flows along an inside of the pipe 30 through the first opening 34a and the second opening 34b.

Figure 2A:
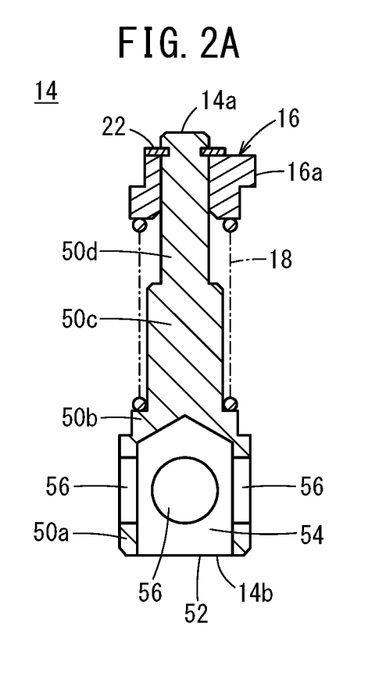
FIG. 2A is a longitudinal cross-sectional view showing a columnar section of the one-way valve.
Figure 2B:
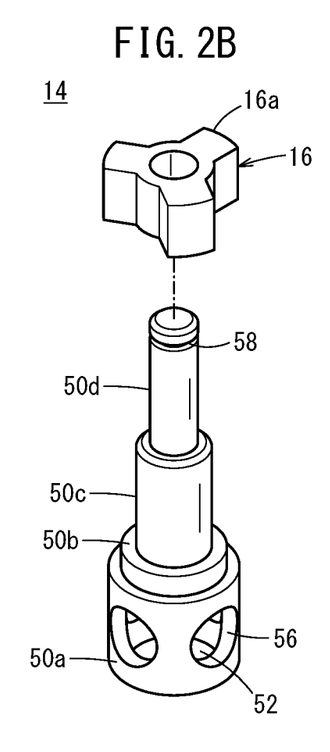
FIG. 2B is an exploded perspective view showing the columnar section of the one-way valve.
Figure 2C:
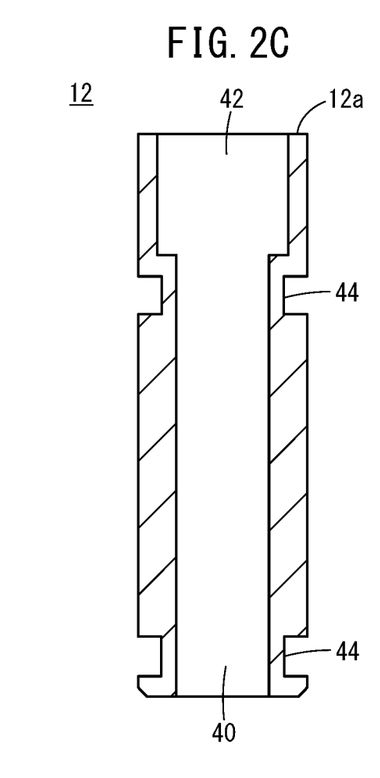
FIG. 2C is a longitudinal cross-sectional view showing a cylindrical section of the one-way valve.

Moreover, as shown in FIG. 2C, the cylindrical section 12 is configured so that an inner diameter of the through-hole 40 changes in at least two stages in one direction, and so that a later-mentioned first outer diameter section 50a of the columnar section 14 moves in a sliding manner along an opening section 42 where the inner diameter is large, of the through-hole 40. Note that an outer circumferential surface of the one end 12a of the cylindrical section 12 has an annular groove 44 for O-ring installation.

As shown in FIGS. 2A and 2B, an outer diameter of the columnar section 14 narrows in at least four stages in one direction. The columnar section 14 is configured from the first outer diameter section 50a, a second outer diameter section 50b, a third outer diameter section 50c, and a fourth outer diameter section 50d that are formed integrally from a rear end to a tip of the columnar section 14. The first outer diameter section 50a whose outer diameter is largest has a hollow section 54 that has an opening 52 in the end surface thereof. A plurality of lateral holes 56 (through-holes) are formed at equal intervals, for example, in a side wall of this hollow section 54.

The collar member 16 is inserted, in a freely reciprocating manner, over the fourth outer diameter section 50d whose outer diameter is smallest. This collar member 16 is provided with a plurality of cantilevered projections 16a that are formed radially. A diameter of an imaginary circle configured by joining tips of the plurality of projections 16a is larger than the inner diameter dc of the third inner circumferential surface 36c of the hollow section 32 in the pipe 30.

Moreover, a tip section of this fourth outer diameter section 50d has an annular groove 58, and, a retainer clip such as, for example, the E-ring 22 (refer to FIGS. 1A and 2A) is fitted in the groove 58. This E-ring 22 prevents the collar member 16 that moves in a reciprocating manner along the columnar section 14 from falling from the columnar section 14.

Furthermore, the spring 18 (a compression spring) is attached between the second outer diameter section 50b and the collar member 16, as shown. Due to interposition of this spring 18, the collar member 16 is always biased upwardly, that is, toward the E-ring 22.

Moreover, as shown in FIG. 1A, if hydraulic pressure on another end 14b side in the columnar section 14 is less than a predetermined pressure, the columnar section 14 is pressed to the cylindrical section 12 side due to that differential pressure. The term "less than a predetermined pressure" refers to the above-described hydraulic pressure being lower than a total of hydraulic pressure on one end 14a side and pressure of the spring 18. In this case, the first outer diameter section 50a of the columnar section 14 is housed in the opening section 42 of the cylindrical section 12 to be brought into a fluid-tight sealed state. As a result, flow of oil from the cylindrical section 12 to the second opening 34b of the pipe 30 is blocked.

Contrarily, as shown in FIG. 1B, if hydraulic pressure on the other end 14b side in the columnar section 14 is a predetermined pressure or more, the columnar section 14 is pressed to an inner circumferential surface side in the depth direction of the pipe 30 due to that differential pressure. The term "a predetermined pressure or more" refers to the above-described hydraulic pressure being higher than a total of hydraulic pressure on the one end 14a side and pressure of the spring 18. In this case, the collar member 16 contacts a level difference 38, and entry into the hollow section 32 of the collar member 16 is prevented. The level difference 38 is formed by a difference in inner diameter between the second inner circumferential surface 36b and the third inner circumferential surface 36c in the pipe 30 contacted by tip sections of the projections 16a.

Hence, a portion of the columnar section 14, excluding the collar member 16, moves inside the hollow section 32 of the pipe 30, and the fourth outer diameter section 50d of the columnar section 14, along with the E-ring 22, is positioned on the inner circumferential surface side in the depth direction of the pipe 30. As a result, the first outer diameter section 50a of the columnar section 14 separates from the opening section 42 at the outlet end of the cylindrical section 12, and the plurality of lateral holes 56 of the first outer diameter section 50a are exposed to the inside of the pipe 30. Hence, oil flows from the cylindrical section 12 to the inside of the pipe 30, and the oil is discharged to outside through the second opening 34b of the pipe 30.

Figure 3:
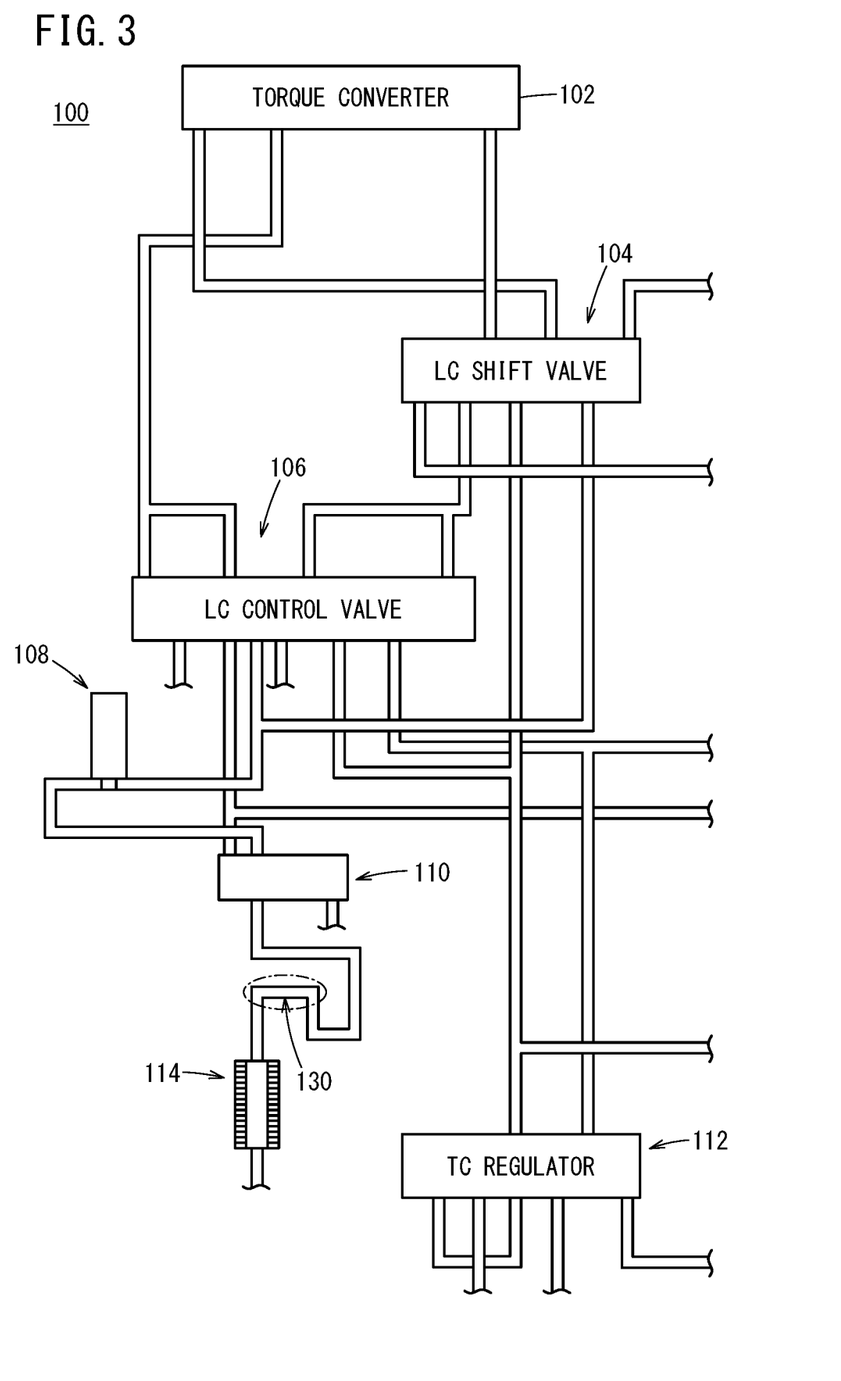
FIG. 3 is a hydraulic circuit diagram showing one example of a transmission according to the present embodiment.

Moreover, the one-way valve 10 according to the present embodiment is installed in a transmission 100 according to the present embodiment shown in FIG. 3.

As shown in FIG. 3, this transmission 100 includes at least a torque converter 102, an LC shift valve 104, an LC control valve 106, a cooler check valve 108, a TC check valve 110, a TC regulator 112, and an oil warmer 114.

Figure 4:
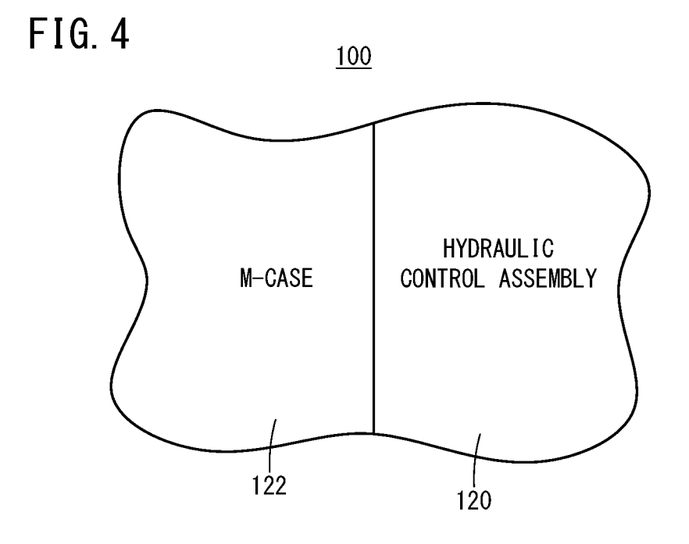
FIG. 4 is a schematic view showing, with partial omissions, a hydraulic control assembly in which a hydraulic control valve or the like is incorporated, and an M-case in which the hydraulic control assembly is housed.

As shown schematically in FIG. 4, the transmission 100 includes: a hydraulic control assembly 120 (a control system) in which the above-mentioned plurality of hydraulic control valves and so on are incorporated; and an M-case 122 in which the hydraulic control assembly 120 is housed.

Figure 5:
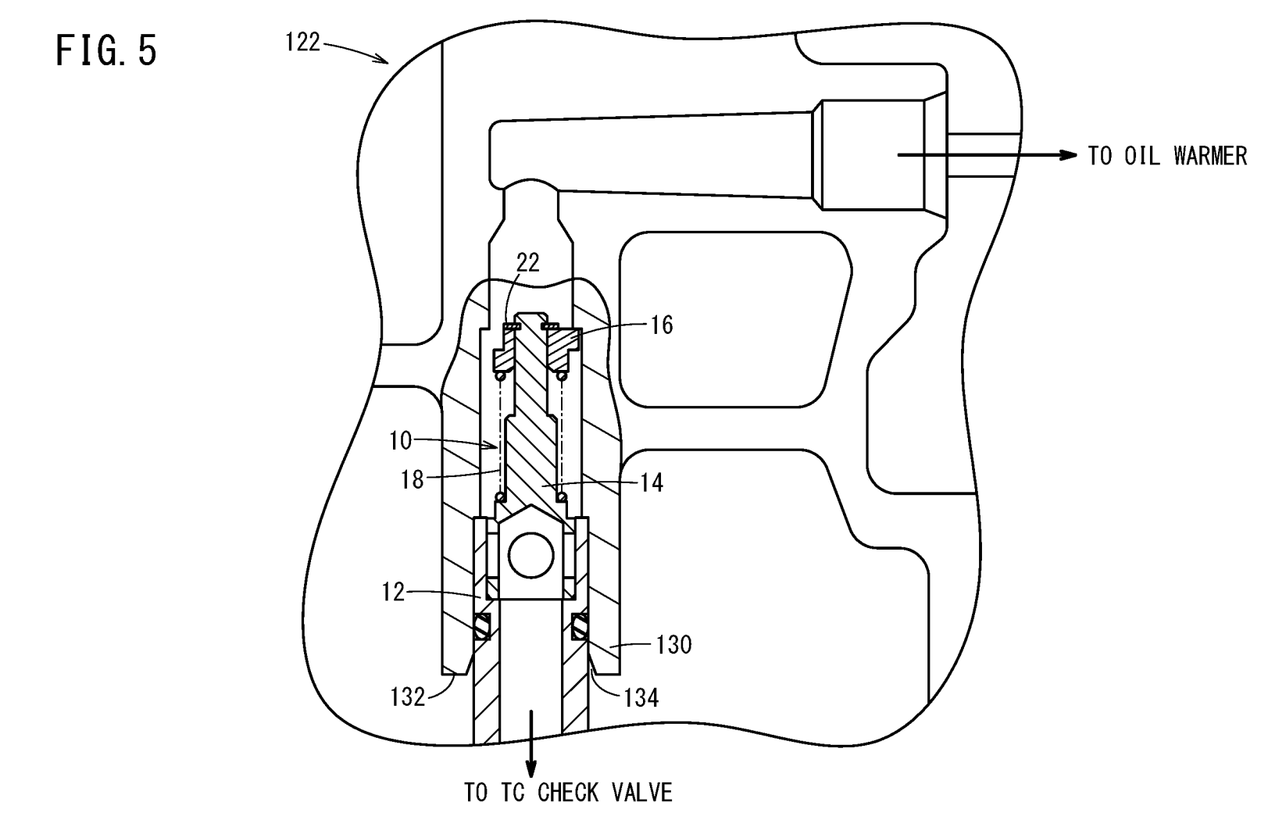
FIG. 5 is a view showing, in a partially fractured manner, a state where the one-way valve according to the present embodiment has been post-installed in a pipe in the M-case.

Moreover, in the present embodiment, as shown in FIG. 5, the above-mentioned one-way valve 10 is post-installed in a pipe 130 (refer to FIG. 3) arranged between, for example, the TC check valve 110 and the oil warmer 114, in the M-case 122. In this case, the cylindrical section 12 is disposed on the TC check valve 110 side, and the columnar section 14 is disposed on the oil warmer 114 side.

In the example of FIG. 5, by inserting the one-way valve 10 inside the pipe 130 from an opening portion 134 of a joint 132 of the pipe 130, the one-way valve 10 can be simply post-installed in the pipe 130 in the M-case 122. The one-way valve 10 is configured by at least the cylindrical section 12, the columnar section 14, the collar member 16, the spring 18, the E-ring 22, and so on.

Moreover, when, for example, a vehicle is left for a long period, hydraulic pressure of less than a predetermined pressure is applied to the one-way valve 10 from the TC check valve 110. Therefore, as mentioned above, the first outer diameter section 50a of the columnar section 14 is housed in the opening section 42 of the cylindrical section 12 to be brought into a fluid-tight sealed state. As a result, flow of oil from the TC check valve 110 to the oil warmer 114 is blocked.

When the vehicle is driven, sometimes, due to various kinds of hydraulic control, hydraulic pressure of a predetermined pressure or more is applied to the one-way valve 10 from the TC check valve 110. At that time, as mentioned above, each time that hydraulic pressure of a predetermined pressure or more is applied, the plurality of lateral holes 56 of the first outer diameter section 50a are exposed to the inside of the pipe 130. As a result, oil flows from the cylindrical section 12 to the inside of the pipe 130, and the oil flows from the TC check valve 110 into the oil warmer 114.

[Inventions Obtained from Embodiment]

Inventions understandable from the above-described embodiment will be described below.

[1] The one-way valve 10 according to the present embodiment includes: the cylindrical section 12, the one end 12a of which is inserted into and fixed to the inside of the pipe 30, the cylindrical section 12 including the through-hole 40 through which oil is passed in the axial direction; and the columnar section 14 housed inside the pipe 30 and including, in the other end 14b thereof, the plurality of lateral holes 56 through which oil is passed, flow of oil being blocked when the other end 14b is inserted into the one-side opening section 42 of the cylindrical section 12.

If hydraulic pressure on the one end 14a side in the columnar section 14 is higher than hydraulic pressure on the other end 14b side in the columnar section 14, the columnar section 14 is pressed to the cylindrical section 12 side due to that differential pressure. As a result, the other end 14b is inserted into the one-side opening section 42 of the cylindrical section 12, and flow of oil from the cylindrical section 12 to the pipe 30 is blocked. Of course, flow of oil from the pipe 30 to the cylindrical section 12 is also blocked.

Contrarily, if hydraulic pressure on the one end 14a side in the columnar section 14 is lower than hydraulic pressure on the other end 14b side in the columnar section 14, the columnar section 14 is pressed to the pipe 30 side due to that differential pressure. As a result, the other end 14b of the columnar section 14 separates from the one-side opening section 42 of the cylindrical section 12, and oil flows from the cylindrical section 12 to the pipe 30.

Thus, by adopting the above-mentioned configuration, the one-way valve 10 can be simply installed in the pipe 30 laid in the hydraulic control assembly 120, without the layout of an oil path in the hydraulic control assembly 120 being made complicated.

[2] In the present embodiment, the one-way valve further includes: the collar member 16 inserted over the one end 14a of the columnar section 14 and provided with the plurality of projections 16a that are formed radially; and the spring 18 installed between the other end 14b of the columnar section 14 and the collar member 16.

If hydraulic pressure on the one end 14a side in the columnar section 14 is higher than the total of hydraulic pressure on the other end 14b side and pressure of the spring 18, the columnar section 14 is pressed to the cylindrical section 12 side due to that differential pressure. As a result, the other end 14b is inserted into the one-side opening section 42 of the cylindrical section 12, and flow of oil from the cylindrical section 12 to the pipe 30 is blocked. Of course, flow of oil from the pipe 30 to the cylindrical section 12 is also blocked.

Contrarily, if hydraulic pressure on the one end 14a side in the columnar section 14 is lower than the total of hydraulic pressure on the other end 14b side and pressure of the spring 18, the columnar section 14 is pressed to the pipe 30 side due to that differential pressure. As a result, the other end 14b of the columnar section 14 (an expanded diameter section) separates from the one-side opening section 42 of the cylindrical section 12, and oil flows from the cylindrical section 12 to the pipe 30.

[3] In the present embodiment, the annular groove 44 is formed in the outer circumferential surface of the one end 12a of the cylindrical section 12, and the one-way valve further includes the O-ring 20 installed in the annular groove 44 of the cylindrical section 12. As a result, relative movement (sliding along one another) of the pipe 30 and the cylindrical section 12 can be restricted, and the cylindrical section 12 can be prevented from dislocating from the pipe 30.

[4] In the present embodiment, the one-way valve further includes the E-ring 22 fixed to the tip of the columnar section 14. As a result, the collar member 16 that moves in a reciprocating manner along the columnar section 14 can be prevented from falling from the columnar section 14.

[5] The transmission 100 according to the present embodiment includes: the hydraulic control assembly 120 in which the plurality of hydraulic control valves are incorporated; and the M-case 122 in which the hydraulic control assembly 120 is housed. Moreover, in the transmission 100, the one-way valve 10 according to the present embodiment is disposed in the M-case 122.

There is a problem that when the vehicle is left for a long period, oil in the torque converter 102 falls into an oil pan (oil return), and at a restart time, creep torque does not occur until refilling of oil is completed.

As a countermeasure against this, it is conceivable for a discharge oil path to be sealed by the one-way valve 10 during oil pump stoppage so as to prevent oil escaping. In this case, for installation of the one-way valve 10, the hydraulic control assembly 120 is conceivably designed as follows. That is, there may be considered reducing an oil path area of a portion where oil path layout is difficult, and thereby securing an installation area for the one-way valve 10.

However, such a method causes a new problem that the layout of the oil path in the hydraulic control assembly 120 becomes complicated.

Accordingly, the one-way valve 10 according to the present embodiment is installed in the M-case 122, not in the hydraulic control assembly 120. As a result, oil return from the torque converter 102 can be stopped, without changing the hydraulic control assembly 120.

Since there is no need for the hydraulic control assembly 120 to be changed, work to install the one-way valve 10 can be performed simply at low cost. Therefore, the one-way valve 10 can be simply post-installed in a vehicle requiring a countermeasure against oil return from the torque converter 102.

[6] In the present embodiment, the M-case 122 includes at least one pipe 130, and at least the columnar section 14 and the one end 12a of the cylindrical section 12 of the one-way valve 10 are inserted into and fixed to the inside of the pipe 130. As a result, the one-way valve 10 can be simply disposed in the M-case 122 by adopting, for example, the following configuration, that is, a configuration where at least the columnar section 14 and the one end 12a of the cylindrical section 12 of the one-way valve 10 are inserted into and fixed to the inside of the pipe 130, and so on.

[7] In the present embodiment, the one-way valve 10 is installed in the M-case 122 at a location upstream of and close to the oil warmer 114.

Although there is a gap in a seal ring, it is possible for leakage to be eliminated by surface tension, provided an applied pressure is sufficiently small. Two cases of oil escaping from an oil-filled state are given below.

(1) Air is sucked from the seal ring and oil escapes from a lubricating path.

(2) Air is sucked from the seal ring and oil escapes from the seal ring.

In case (2) of the above-described two cases, when a large gap is opened in a seal ring outer circumference or miter section in a state where hydraulic pressure is not being applied, escape occurs by air being sucked from an upper side to be expelled from a lower side. As a countermeasure, a structure is adopted in which a diameter-when-free of the seal ring is enlarged so as to attach to the outer circumferential side even in a state where hydraulic pressure is not being applied.

Case (1) can be prevented by adding the one-way valve 10 to the lubricating path. Moreover, by cutting off the lubricating path, a negative pressure ceases to be applied to the seal ring, which is effective also for case (2).

Accordingly, by post-installing the one-way valve 10 in the M-case 122 at a location upstream of and close to the oil warmer 114, a countermeasure can be taken against oil escape in (1) and (2) above, without making a significant change. In the present embodiment, the one-way valve 10 is installed between the TC check valve 110 and the oil warmer 114, and closely to the oil warmer 114.

Note that the present invention is not limited to the above-mentioned embodiment and may of course be freely changed in a range not departing from the spirit of the present invention.

What is claimed is:

1. A one-way valve assembly, comprising a pipe having a hollow section formed therein and a one-way valve disposed in the hollow section of the pipe,
    wherein the hollow section has a first inner circumferential surface, a second inner circumferential surface, and a third inner circumferential surface, inner diameters of which decrease in this order,
    wherein a portion of the one-way valve is received in the hollow section of the pipe at the first circumferential surface thereof, and wherein the one-way valve comprises:
        a cylindrical tube section having a hollow bore formed therein, wherein an outlet end of the cylindrical tube section is inserted into and fixed to an inside of the pipe, the cylindrical tube section having a through-hole formed therein in fluid communication with the hollow bore thereof, which is configured to receive oil flowing therethrough in an axial direction during use;
        a columnar flow control section that is housed inside the pipe and including, in an inlet end thereof, a plurality of lateral holes and also having an opening formed therein through which oil from the cylindrical tube section flows during use, the flow control section configured to selectively block a flow of oil therethrough when the inlet end is inserted into a one-side opening in the outlet end of the cylindrical tube section;
        a collar member that is slidably disposed, in a freely reciprocating manner, over one end of the columnar flow control section and contacts a step level difference, the collar member having a diameter larger than the inner diameter of the third inner circumferential surface, and wherein the step level difference is formed by a difference in inner diameter between the second inner circumferential surface and the third inner circumferential surface
        a spring installed between the inlet end portion of the columnar flow control section and the collar member; and
        a retainer clip that is fixed to a tip of the columnar flow control section and that retains the collar member thereon.

2. The one-way valve assembly according to claim 1, wherein the collar member is provided with a plurality of cantilevered projections that are formed radially thereon, the projections defining open spaces therebetween.

3. The one-way valve assembly according to claim 1, wherein
    an annular groove is formed in an outer circumferential surface of the one end of the cylindrical tube section, and
    the one-way valve further comprises an 0-ring installed in the annular groove of the cylindrical tube section.

4. The one-way valve assembly according to claim 1, wherein the retainer clip comprises an E-ring fixed to a tip of the columnar section.

5. The one-way valve according to claim 1, wherein an inlet portion of the cylindrical tube section has a hollow interior space formed therein having a first diameter, and an outlet end of the cylindrical tube section has an enlarged diameter portion formed therein forming a step portion which defines a seat configured to receive the inlet end of the columnar flow control section therein, the enlarged diameter portion having a second diameter which is greater than the first diameter.

6. A transmission comprising:
    a hydraulic control assembly in which a plurality of hydraulic control valves are incorporated; and
    a case in which the hydraulic control assembly is housed, wherein:
    a one-way valve is disposed in the case, the one-way valve is inserted from a first inner circumferential surface side into and fixed to a pipe,
    the pipe includes a hollow section which includes the first inner circumferential surface, a second inner circumferential surface, and a third inner circumferential surface, inner diameters of which decrease in this order,
    the one-way valve includes:
    a cylindrical tube section having a hollow bore formed therein, wherein an outlet end of the cylindrical tube section is inserted into and fixed to an inside of the pipe, the cylindrical tube section having a through-hole formed therein in fluid communication with the hollow bore thereof, and which is configured to receive oil flowing therethrough in an axial direction during use;

a columnar flow control section that is housed inside the pipe, includes in another end thereof, a plurality of lateral holes and an opening through which oil coming from the cylindrical tube section flows, the columnar flow control section configured to selectively block flow of oil therethrough when the inlet end is inserted into a one-side opening in the outlet end of the cylindrical tube sections;

a collar member that is inserted, in a freely reciprocating manner, over one end of the columnar flow control section and contacts a step level difference, the collar member having a diameter larger than the inner diameter of the third inner circumferential surface, and wherein the step level difference is formed by a difference in inner diameter between the second inner circumferential surface and the third inner circumferential surface;

a spring installed between the inlet end portion of the columnar flow control section and the collar member; and a retainer clip that is fixed to a tip of the columnar flow control section and that retains prevents the collar member thereon.

7. The transmission according to claim 6, wherein the collar member is provided with a plurality of cantilevered projections that are formed radially thereon, the projections defining open spaces therebetween.

8. The transmission according to claim 6, wherein
in the one-way valve, an annular groove is formed in an outer circumferential surface of the one end of the cylindrical tube section, and
the one-way valve further includes an 0- ring installed in the annular groove of the cylindrical tube section.

9. The transmission according to claim 6, wherein the outlet end of the cylindrical tube section of the one-way valve is inserted into and fixed to an inside of the pipe.

10. The transmission according to claim 6, wherein the one-way valve is installed in the case at a location upstream of and close to an oil warmer.

11. A one-way valve assembly, comprising a pipe having a hollow section formed therein and a one-way valve disposed in the hollow section of the pipe,
wherein the hollow section has a first inner circumferential surface, a second inner circumferential surface, and a third inner circumferential surface, inner diameters of which decrease in this order, wherein a portion of the one-way valve is received in the hollow section of the pipe at the first circumferential surface thereof, and wherein the one-way valve comprises:

a cylindrical tube section having a hollow bore formed therein, wherein an outlet end of the cylindrical tube section is inserted into and fixed to an inside of the pipe, the cylindrical tube section having a through-hole formed therein in fluid communication with the hollow bore thereof, and which is configured to receive oil flowing therethrough in an axial direction during use;

a columnar flow control section that is housed inside the pipe and includes, in an inlet end thereof, a plurality of lateral holes and also having an opening formed therein through which oil from the cylindrical tube section flows during use, the flow control section configured to selectively block a flow of oil therethrough when the inlet end is inserted into a one-side opening in the outlet end of the cylindrical tube section;

a collar member that is slidably disposed, in a freely reciprocating manner, over one end of the columnar flow control section and contacts a step level difference inside the pipe, the collar member provided with a plurality of cantilevered projections that are formed radially thereon, the projections defining open spaces therebetween, the collar member having a diameter larger than the inner diameter of the third inner circumferential surface, and wherein the step level difference is formed by a difference in inner diameter between the second inner circumferential surface and the third inner circumferential surface of the pipe's hollow section;

a spring installed between an end portion of the columnar flow control section and the collar member; and a retainer clip that is fixed to a tip of the columnar flow control section and that retains the collar member thereon, wherein an inlet portion of the cylindrical tube section has a hollow interior formed therein having a first diameter, and an outlet end of the cylindrical tube section has an enlarged diameter portion formed therein forming a step portion which defines a seat configured to receive the inlet end of the columnar flow control section therein.

* * * * *